(12) United States Patent
Inoue et al.

(10) Patent No.: US 11,318,704 B2
(45) Date of Patent: May 3, 2022

(54) VEHICLE INTERIOR MATERIAL AND MANUFACTURING METHOD OF THE SAME

(71) Applicants: TAKEHIRO CO.,LTD., Anjo (JP); TOYOTA JIDOSHA KABUSHIKI KAISHA, Toyota (JP); TOYOTA BOSHOKU KABUSHIKI KAISHA, Kariya (JP)

(72) Inventors: Koji Inoue, Kariya (JP); Seiji Sugiura, Anjo (JP); Madoka Doi, Kariya (JP); Hideki Kawashiri, Toyota (JP); Tokuyoshi Shimizu, Nishio (JP)

(73) Assignees: TAKEHIRO CO., LTD., Anjo (JP); TOYOTA JIDOSHA KABUSHIKI KAISHA, Toyota (JP); TOYOTA BOSHOKU KABUSHIKI KAISHA, Kariya (JP)

( * ) Notice: Subject to any disclaimer, the term of this patent is extended or adjusted under 35 U.S.C. 154(b) by 420 days.

(21) Appl. No.: 16/264,844

(22) Filed: Feb. 1, 2019

(65) Prior Publication Data

US 2019/0232607 A1    Aug. 1, 2019

(30) Foreign Application Priority Data

Feb. 1, 2018    (JP) ................ JP2018-16164

(51) Int. Cl.
*B32B 5/06* (2006.01)
*B29C 70/12* (2006.01)
(Continued)

(52) U.S. Cl.
CPC ............ *B32B 5/06* (2013.01); *B29C 70/12* (2013.01); *B29C 70/465* (2013.01); *B32B 5/08* (2013.01);
(Continued)

(58) Field of Classification Search
CPC ..... B29C 43/203; B29C 70/12; B29C 70/465; B29K 2023/12; B29K 2067/003;
(Continued)

(56) References Cited

U.S. PATENT DOCUMENTS

2004/0185239 A1    9/2004 Nakamura et al.

FOREIGN PATENT DOCUMENTS

| EP | 2743388 A1 | 6/2014 |
|---|---|---|
| JP | 2001138823 A | 5/2001 |

(Continued)

*Primary Examiner* — Camie S Thompson
(74) *Attorney, Agent, or Firm* — Brundidge & Stanger, P.C.

(57) ABSTRACT

A vehicle interior material that is manufactured at by bonding a base member and a surface member with each other without using an adhesive agent or an adhesive film, that is light in weight and that has adhesive strength and abrasion resistance. The base member includes a natural fiber or a glass fiber and a first thermoplastic resin fiber and has a density of 0.2 to 0.7 g/cm$^3$ The surface member includes a second thermoplastic resin fiber and a low melting point resin fiber and that has a weight per unit area of 50 to 500 g/m$^2$. The surface member is laid on a surface of the base member. An entangled layer where the second thermoplastic resin fiber enters texture of the base member to be entangled with the first thermoplastic resin fiber is provided at an interface between the base member and the surface member.

9 Claims, 3 Drawing Sheets

(51) Int. Cl.
*B29C 70/46* (2006.01)
*B32B 5/26* (2006.01)
*B32B 27/08* (2006.01)
*B32B 5/14* (2006.01)
*B32B 27/36* (2006.01)
*B32B 5/08* (2006.01)
*B32B 27/32* (2006.01)
*B32B 7/027* (2019.01)
*B29L 31/30* (2006.01)
*B29K 23/00* (2006.01)
*B29K 67/00* (2006.01)
*B29K 309/08* (2006.01)
*B29K 311/00* (2006.01)

(52) U.S. Cl.
CPC ............... *B32B 5/145* (2013.01); *B32B 5/26* (2013.01); *B32B 7/027* (2019.01); *B32B 27/08* (2013.01); *B32B 27/32* (2013.01); *B32B 27/36* (2013.01); *B29K 2023/12* (2013.01); *B29K 2067/003* (2013.01); *B29K 2309/08* (2013.01); *B29K 2311/00* (2013.01); *B29L 2031/3005* (2013.01); *B32B 2262/02* (2013.01); *B32B 2262/0253* (2013.01); *B32B 2262/0276* (2013.01); *B32B 2262/0284* (2013.01); *B32B 2262/06* (2013.01); *B32B 2262/065* (2013.01); *B32B 2262/101* (2013.01); *B32B 2262/14* (2013.01); *B32B 2307/30* (2013.01); *B32B 2307/718* (2013.01); *B32B 2307/72* (2013.01); *B32B 2605/003* (2013.01)

(58) Field of Classification Search
CPC ............ B29K 2311/00; B29K 2311/14; B29L 2031/3005; B29L 2031/3041; B32B 2262/92; B32B 2262/0253; B32B 2262/0276; B32B 2262/0284; B32B 2262/06; B32B 2262/065; B32B 2262/14; B32B 2307/72; B32B 2307/73; B32B 2605/003; B32B 27/08; B32B 2307/536; B32B 2307/304; B32B 2307/102; B32B 5/06; B32B 5/08; B32B 5/26; B32B 38/04; B32B 27/32; B32B 27/36; Y10T 428/24603; Y10T 428/249925; Y10T 428/31855; B60R 13/08; B60R 13/02; B60R 13/0815; D04H 1/542; D04H 1/593
USPC ...... 428/171, 292.4, 500, 319.3, 339, 537.1, 428/537.5, 35.7; 427/288; 442/152, 164
See application file for complete search history.

(56) References Cited

FOREIGN PATENT DOCUMENTS

| | | |
|---|---|---|
| JP | 200635949 A | 2/2006 |
| JP | 2014233969 A | 12/2014 |
| WO | 2008044892 A1 | 4/2008 |

VEHICLE INTERIOR MATERIAL AND MANUFACTURING METHOD OF THE SAME

TECHNICAL FIELD

The present disclosure relates to a vehicle interior material provided in, for example, portions behind seats or the like in a vehicle such as a motor vehicle.

BACKGROUND OF THE INVENTION

The vehicle interior material uses a mixture of a natural fiber such as kenaf and a polypropylene (PP) fiber as a material of a base member. A surface member (for example, a carpet material) is applied on a surface of the base member. Conventionally known techniques include a method of placing a resin film between the base member and the surface member (for example, between a board and a carpet material) in the process of bonding the surface member to the base member, a method of applying a backing material including an adhesive layer to the surface member and then bonding the surface member to the base member as described in, for example, JP 2001-138823A, and a method of welding a film to bond the surface member to the base member as described in, for example, JP 2006-35949A.

A rear face of the surface member such as the carpet material is conventionally coated with a thin layer of an acrylic resin, with a view to improving the abrasion resistance. The presence of the acrylic resin layer, however, prevents the fibers of the surface member from entering the base member. This satisfies the requirement of the abrasion resistance for the vehicle interior material but does not satisfy the requirement of the adhesive performance. Disusing the acrylic resin, on the other hand, satisfies the requirement of the adhesive performance but does not satisfy the requirement of the abrasion resistance. It is difficult to satisfy both the adhesive performance and the abrasion resistance since these are conflicting.

There is a demand to disuse the conventionally used film or adhesive agent of the adhesive layer and thereby to reduce the cost and simplify the manufacturing process.

SUMMARY OF THE INVENTION

The surface member is, however, not bonded to the base member by simply disusing the film or the adhesive agent in the vehicle interior materials described in JP 2001-138823A and JP 2006-35949A. Accordingly, the prior art vehicle interior materials have problems of difficulty in weight reduction, complicated manufacturing process and difficulty in cost reduction.

An object of the present disclosure accordingly is to provide a vehicle interior material that is manufactured at a low cost by bonding a base member with a surface member without using an adhesive agent or a film to form an intermediate layer of a backing material or a film, that is light in weight and that has abrasion resistance.

There is a difficulty in satisfying both the adhesive strength between a base member and a surface member and the abrasion resistance as a vehicle component as the performances required for the vehicle interior material. The inventors have intensively studied the configuration of the surface member and the configuration of the base member in order to satisfy these two performances simultaneously. As the result of the intensive studies, the inventors have achieved the vehicle interior material of the present disclosure by devising the surface member and the base member to solve the above problem and to satisfy the requirements of both the adhesive strength and the abrasion resistance.

Specifically, a first aspect of the present disclosure provides a vehicle interior material, comprising a base member that includes a natural fiber or a glass fiber and a first thermoplastic resin fiber and that has a density of 0.2 to 0.7 $g/cm^3$, and a surface member that includes a second thermoplastic resin fiber and a low melting point resin fiber and that has a weight per unit area of 50 to 500 $g/m^2$. The surface member is laid on a surface of the base member. An entangled layer where the second thermoplastic resin fiber enters texture of the base member to be entangled with the natural fiber or the glass fiber and the first thermoplastic resin fiber is provided at an interface between the base member and the surface member. An adhesive strength between the base member and the surface member is 5 to 80 N/25 mm by peeling of 180 degrees with a peeling width of 25 mm.

In the vehicle interior material of this aspect, the fibers included in the surface member penetrate between and are entangled with the fibers included in the base member at the interface between the base member and the surface member. This serves as the anchor effect and increases the adhesive strength. The adhesive strength of 5 to 80 N/25 mm by peeling of 180 degrees at the peeling width of 250 mm satisfies the adhesive strength required for the vehicle interior material. The surface member includes the low melting point resin fiber. This causes the second thermoplastic resin fibers of the surface member to be bonded with each other and improves the abrasion resistance.

It is preferable that the natural fiber is comprised of a plant fiber, the first thermoplastic resin fiber is comprised of a polypropylene resin fiber, and the second thermoplastic resin fiber is comprised of a polyester resin fiber.

It is preferable that the surface member further includes a polypropylene resin fiber.

Preferably, the low melting point resin fiber is a low melting point polyester resin fiber or a low melting point polyethylene resin fiber.

A second aspect of the present disclosure provides a manufacturing method of a vehicle interior material. The method comprises a heating and expanding step of heating a base member that includes a natural fiber or a glass fiber and a first thermoplastic resin fiber and that has a density of 0.2 to 0.7 $g/cm^3$ to thermally expand thickness of the base member by 15 to 30% and make a state of fibers in the base member from a dense state to a sparse state, and a bonding step of laying a surface member that includes a second thermoplastic resin fiber and a low melting point resin fiber and that has a weight per unit area of 50 to 500 $g/cm^2$, on the heated and expanded base member, compressing the surface member laid on the base member to bond the surface member with the base member such that the second thermoplastic resin fiber enters texture of the base member to be entangled with the natural fiber or the glass fiber and the first thermoplastic resin fiber, and melting and solidifying the low melting point resin fiber in the surface member.

In the manufacturing method of the vehicle interior material of this aspect, the fibers in the base member are made sparse in the heating and expanding step, and the surface member is laid on the base member and is compressed in the subsequent bonding step. This causes the fibers included in the surface member to penetrate between the fibers included in the base member. This serves as the anchor effect and increases the adhesive strength. The surface member including the low melting point resin is laid on the base member that is heated in the heating and expanding step. This melts and solidifies the low melting point resin and causes the second thermoplastic resin fibers included in the surface member to be bonded with each other. This accordingly improves the abrasion resistance.

The above examples are also employed as the natural fiber, the first thermoplastic resin fiber, the second thermoplastic resin fiber and the low melting point resin fiber in the manufacturing method of the vehicle interior material. The above description is accordingly applied to the manufacturing method of the vehicle interior material of this aspect.

Preferably, the surface member further includes a polypropylene resin fiber, and the bonding step comprises melting and solidifying the polypropylene resin fiber included in the base member and the polypropylene resin fiber included in the surface member.

In the manufacturing method of the vehicle interior material of this aspect, the melted and solidified polypropylene resin fiber further enhances entangling of the second thermoplastic resin fiber included in the surface member with the fibers included in the base member. This configuration thus further increases the adhesive strength.

Preferably, the bonding step comprises molding the vehicle interior material simultaneously with bonding the base member and the surface member.

The configuration of the present disclosure provides the vehicle interior material that has a simpler configuration with both the abrasion resistance and the adhesive property, that is light in weight and that is manufactured at a low cost.

DESCRIPTION OF EMBODIMENTS

Figure 1:
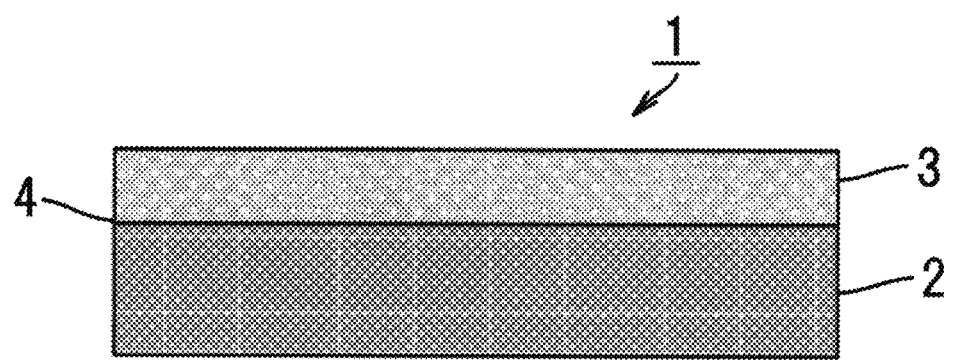
FIG. 1 is a sectional view illustrating a vehicle interior material according to an embodiment of the present disclosure.
Figure 2:
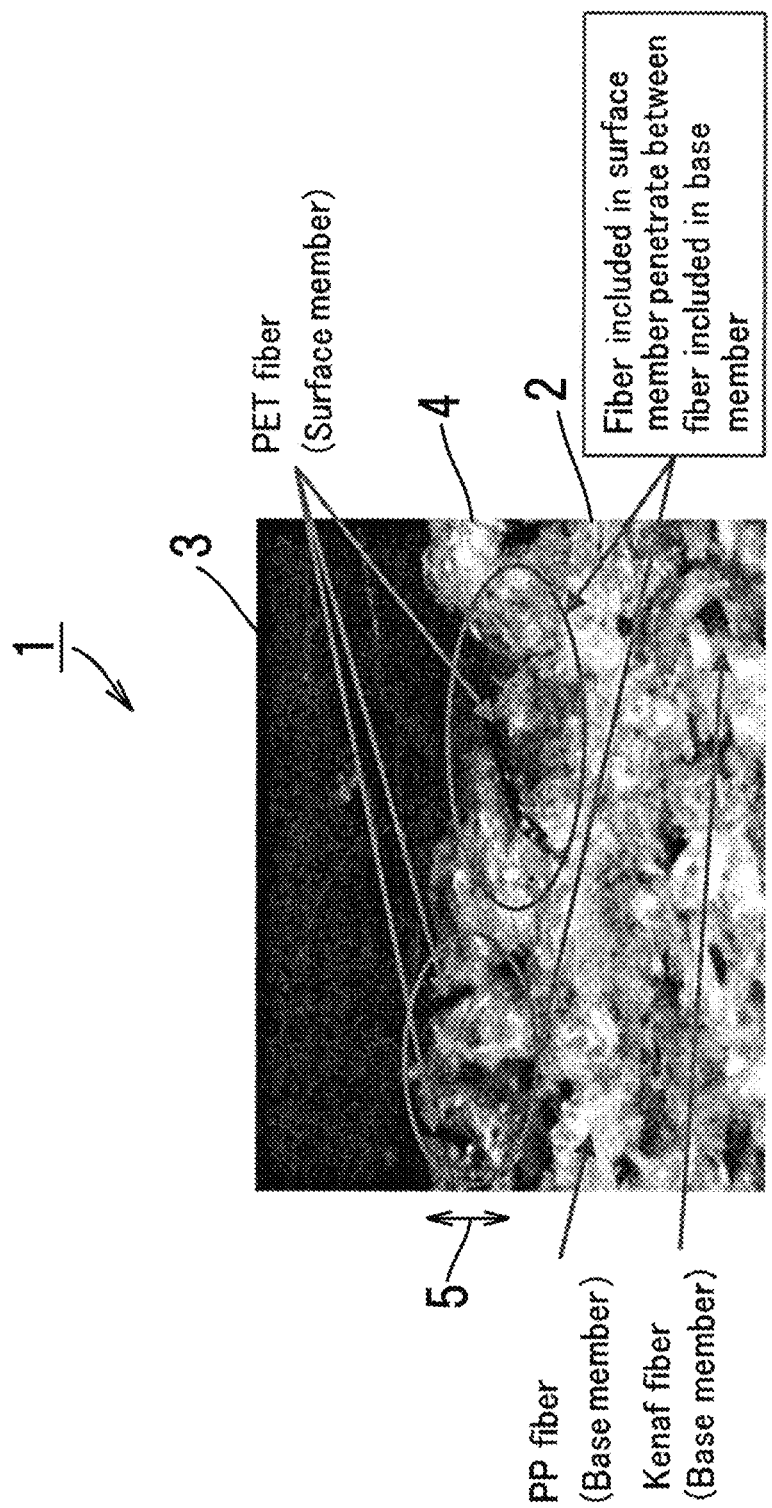
FIG. 2 is a photograph showing a section of a vehicle interior material in Example 1.
Figure 3:
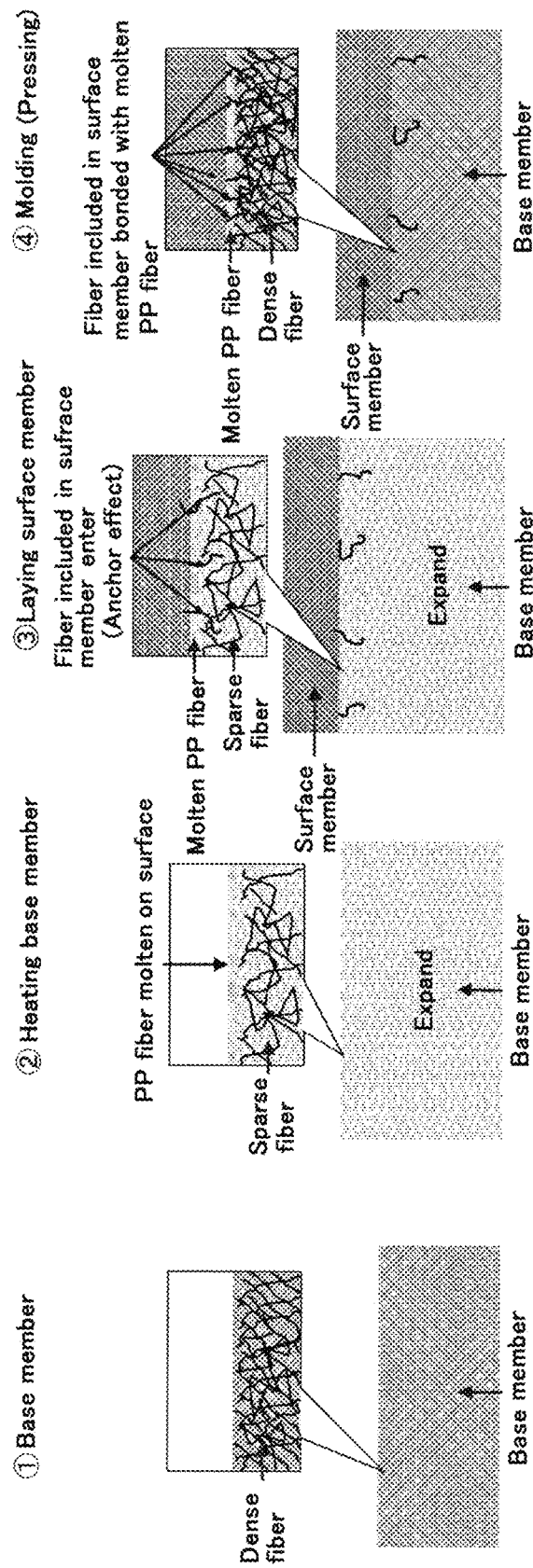
FIG. 3 is a diagram illustrating an entangling mechanism of the vehicle interior material in Example 1.

A vehicle interior material 1 according to Embodiment 1 of the present disclosure is described with reference to FIG. 1 to FIG. 3. The vehicle interior material 1 is used for, for example, a motor vehicle interior component and includes a base member 2 and a surface member 3 that is laid on the base member 2 as shown in FIG. 1 and FIG. 2.

The base member 2 is a plate-like body including kenaf fiber as a natural fiber or glass fiber and polypropylene fiber (hereinafter abbreviated as PP fiber) as a first thermoplastic resin fiber and having a density of 0.2 to 0.7 g/cm$^3$ and a thickness of 2 to 5 mm. The surface member 3 includes polyethylene terephthalate resin fiber (hereinafter abbreviated as PET fiber) as a second thermoplastic resin fiber and a polyester resin fiber, polypropylene fiber (PP fiber), and low melting point polyethylene terephthalate resin fiber (hereinafter abbreviated as LPET fiber) as a low melting point resin fiber, and has a weight per unit area of 50 to 500 g/m$^2$ and a thickness of 0.2 to 3.0 mm.

The surface member 3 is laid on the surface of the base member 2, and an entangled layer 5 is provided at an interface 4 between the base member 2 and the surface member 3 where the PET fiber, the PP fiber and the LPET fiber of the surface member 3 enter the texture of the base member 2 to be entangled with the PP fiber and the kenaf fiber or glass fiber included in the base member 2. FIG. 2 is a photograph showing the interface between the base member 2 and the surface member 3. This photograph proves that the fibers of the surface member 3 penetrate between the fibers of the base member 2. The adhesive strength between the base member 2 and the surface member 3 measured by an evaluation method described later is 5 to 80 N/25 mm by peeling of 180 degrees with a peeling width of 25 mm.

The base member 2 is a member serving as an inner layer or a core material of the vehicle interior material 1 and has the thermoplastic property that provides rigidity when the base member 2 is cooled down after being heated to be softened. The base member 2 is a plate-like body of a fibrous material using a thermoplastic resin or a thermoplastic resin foam as a binder. Examples of the thermoplastic resin used as the binder or more specifically examples of the material of the first thermoplastic resin fiber include polyethylene (PE), polyethylene terephthalate (PET), nylon (PA), polystyrene, acrylonitrile-styrene copolymer, acrylate-styrene-acrylonitrile copolymer and acrylonitrile-butadiene-styrene copolymer, in addition to polypropylene (PP). Examples of the fibrous material include cotton fiber, hemp fiber, kenaf fiber, bamboo fiber, wool fiber, silk fiber, glass fiber, carbon fiber, metal fiber and mixed fibers thereof.

According to the embodiment, the kenaf fiber using polypropylene as the binder is used for the material of the base member 2. The glass fiber using polypropylene as the binder is also preferably used for the material of the base member 2. The weight per unit area of the vehicle interior material 1 is preferably 500 to 1600 g/m$^2$.

In the case where the kenaf fiber and the PP fiber are mixed to be used for the base member 2, the mixing ratio (weight ratio) is preferably 70% to 30% of the PP fiber to 30% to 70% of the kenaf fiber. The mixing ratio may be, for example, 60% of the kenaf fiber and 40% of the PP fiber, 50% of the kenaf fiber and 50% of the PP fiber, or 30% of the kenaf fiber and 70% of the PP fiber. Similarly, in the case where the glass fiber and the PP fiber are mixed, the mixing ratio (weight ratio) is preferably 70% to 30% of the PP fiber to 30% to 70% of the glass fiber.

The material of the surface member 3 is preferably flexible but is not specifically limited. The material of the surface member 3 may be selected from the vehicle interior materials such as nonwoven fabrics of natural fibers and synthetic fibers, natural leathers and artificial leathers and other materials used for interior components of the vehicle. The surface member 3 may be a needle punched carpet.

The composition of the fiber materials of the surface member 3 is important to provide the vehicle interior material 1 with the abrasion resistance and the adhesive property. The LPET fiber that is the low melting point resin included in the surface member contributes to the abrasion resistance. This is because the LPET fiber is melted to couple the PET fibers as the primary fiber with one another when the surface member is heated in a manufacturing process. While the PET fiber is generally melted at 250° C. to 280° C., the LPET fiber has a melting point of about 110° C. and is readily melted by the heat of the base member 2 in a molding process described later. The LPET fiber melted and solidified to couple the PET fibers as the primary fiber with one another in the manufacturing process serves in place of the backing material (for example, acrylic resin) or the film described in Background as the measure to provide the abrasion resistance.

The PP fiber included in the surface member 3 is not essential but contributes to improve the adhesive property. Basically, the base member and the surface member are bonded to each other by the anchor effect that the fibers included in the base member and the fibers included in the surface member are entangled. The PP fiber contained in the surface member, however, causes the PP fiber included in the base member and the PP fiber included in the surface member to be melted and fixed to each other and further enhances bonding of the entangled fibers, thereby further improving the adhesive property. In order to meet the requirements of the abrasion resistance and the adhesive property, the mixing ratio (weight ratio) of the respective fibers is preferably 95 to 50% of the PET resin, 0 to 30% of the PP resin, and 5 to 20% of the LPET resin.

The low melting point resin included in the surface member 3 preferably has a melting point of 90 to 120° C. A material other than LPET used in the embodiment may be employed as the low melting point resin. For example, a material produced by modifying the base material of, for example, PP, PE, PA or PVA to have the melting point of 90 to 120° C. may be employed.

The vehicle interior material of the present disclosure is used for, for example, motor vehicle interior components, package tray trims and shelves and is applicable to various types of automobiles, for example, sedans, coupes, hatchbacks and vans.

The following describes a manufacturing method of the vehicle interior material 1. As shown in FIG. 1 to FIG. 3, the vehicle interior material 1 is produced by press-forming the layers of the base member 2 and the surface member 3. A molding technique of the vehicle interior material 1 is not limited to press-forming but may be changed appropriately. The vehicle interior material 1 may be formed by sheet molding or by injection molding.

1. Heating and Expanding Step

A kenaf board that is one example of the base member 2 that includes the natural fiber and the first thermoplastic resin fiber and that has the density of 0.2 to 0.7 g/cm$^3$ is heated in a heating equipment until the surface temperature and the internal temperature of the base member 2 reach 130 to 240° C. This heats and expands the texture of the kenaf board to loosen the fibers and change the state of the fibers from the dense state to the sparse state and thereby increases the thickness of the kenaf board. The kenaf board is expanded when being heated. The kenaf board prior to heating has the high density of the fibers, but the expanded kenaf board has the low density of the entangled fibers. The kenaf board is softened to be readily formable when being heated. The expansion ratio in the thickness of the kenaf board is preferably 15 to 30%. For example, heating the base member used as a base board having a plate thickness of 3.0 mm expands the plate thickness by approximately 1.15 to 1.3 times. The fiber density of the base member accordingly becomes sparse to such a degree that the fibers of the surface member enter the texture of the base member. This leads to improvement in the adhesive strength in a bonding step described below. In the heating and expanding step, the PP fiber included in the base member is in the molten state.

2. Bonding Step

The base member 2 that is heated to be sufficiently expanded is placed in a lower die of a pressing mold. The surface member 3 is placed in an upper die of the pressing mold, and the base member 2 and the surface member 3 are then pressed in the pressing mold. In this state, the fibers included in the surface member 3 enter the surface of the base member having the fibers in the sparse state to be entangled with the fibers included in the base member 2. This enhances the adhesive strength without using an adhesive agent or a film. This bonding step also severs as a forming step with a mold. One press achieves both bonding and forming. The temperature of the pressing mold during the forming process is 20 to 50° C., with a view to not changing the color and the texture of the surface member 3. The temperatures of the base member 2 and the surface member 3 gradually decrease in the bonding step.

In the course of pressing, the surface member 3 is heated by laying the surface member 3 on the heated base member 2. The temperature of the surface member 3 needs to be higher than the melting point of the LPET fiber. For example, at the heating temperature of 200° C. set in the heating and expanding step, when the surface member 3 is laid on the base member 2 in the bonding step, the LPET fiber in the surface member 3 is melted to bond the PET fibers as the primary fiber of the surface member 3 with one another and enhance the abrasion resistance. It is also preferable that the temperatures of the surface member 3 and the base member 2 during pressing are higher than the melting points of the PP fibers included in the surface member 3 and the base member 2. This causes both the PP fiber included in the surface member 3 and the PP fiber included in the base member 2 to be melted and solidified in the bonding step. This enhances bonding of the entangled fibers and further increases the adhesive strength in the entangled layer.

In the bonding step, the PET fiber, the PP fiber and the LPET fiber of the surface member 3 are entangled with the kenaf fiber and the PP fiber of the base member 2. Immediately after layering of the base member 2 and the surface member 3, only the LPET fiber and the PP fiber among the fibers of the surface member 3 are melted, whereas the PET fiber as the primary fiber of the surface member 3 is not melted, so that the original fibrous configuration is maintained. The surface member 3 and the base member 2 are bonded to each other by entangling the fibers of the surface member 3 with the sparse arrangement of the fibers of the base member 2.

The vehicle interior material 1 of this embodiment satisfies the two performances, i.e., adhesive strength and abrasion resistance by mixing the PET fiber, the LPET fiber and the PP fiber to form the surface member 3 and performing the heating and expanding step and the bonding step as described above.

The inventors of the present disclosure presume the following states (1) to (4) as the entangling mechanism: (1) The base member 2 used as a base board is compressed in advance and has the kenaf fiber and the PP fiber entangled densely. (2) Heating the base board 2 heats and expands the texture of the base member 2 to make the texture sparse and increase the thickness. The density of the base member 2 in the state (2) is lower than the density in the state (1). (3) When the surface member 3 is placed, the PET fiber and the PP fiber of the surface member 3 penetrate between the kenaf fiber and the PP fiber of the base member 2, so that the PP fibers are melted and entangled. When the surface member 3 is set in a pressing mold, the fibers of the surface member 3 penetrate between and entangled with the sparse fibers of the base member 2. The fibers located in the entangling layer among the fibers of the surface member 3 are entangled with the fibers of the base member 2. This entangled part serves as an anchor to ensure the adhesive effect. (4) The base member 2 and the surface member 3 are pressed by the pressing mold to be compressed in the thickness direction and increase the density. The fibers of the base member 2 and the surface member 3 are accordingly entangled, and the surface member 3 is bonded to the base member 2 by the anchor effect and the cooling-based fixation.

The vehicle interior material 1 of the embodiment has the following advantageous effects. The vehicle interior material 1 has the simpler configuration formed from the base member 2 and the surface member 3 without using a backing material or an adhesive film. The vehicle interior material 1 satisfies both the abrasion resistance and the adhesive property, is light in weight and is manufactured at a low cost.

The vehicle interior material is similarly manufactured by using the base member 2 consisting of the first thermoplastic resin fiber and the glass fiber, in place of the kenaf board.

Example 1

The following describes the present disclosure more concretely with referring to Example 1, although the present disclosure is not limited to the description of Example 1.

In the vehicle interior material 1 of Example 1, the base member 2 prior to molding was a kenaf board having the weight per unit area of 1000 g/m² and the thickness of 3.0 mm and containing 60% of kenaf fiber and 40% of PP fiber. Sample 1 containing 80% of PET fiber, 10% of PP fiber and 10% of LPET fiber and sample 2 containing 70% of PET fiber, 20% of PP fiber and 10% of LPET fiber were used for the surface member 3. Both sample 1 and sample 2 had the weight per unit area of 180 g/m². The base member 2 was heated to 200° C., and a pressing mold was set to 20° C. to 50° C. The heated base member 2 was placed in a lower die of the mold, and the surface member 3 was placed in an upper die of the mold. The vehicle interior material was then press-formed. The press-formed vehicle interior material had the thickness of 4 mm.

The vehicle interior material 1 of Example 1 was evaluated for A. adhesive strength and B. abrasion resistance.

A. Adhesive Strength (1) Evaluation Method of Adhesive Strength

A test piece of 150 mm×25 mm was cut from the vehicle interior material 1, and the base member 2 and the surface member 3 were partly peeled off from each other by an appropriate length parallel to a lower side of the test piece. The partly peeled base member 2 and surface member 3 were set in a tensile testing machine (Tensilon universal material testing machine manufactured by A&D Company, Limited), and the adhesive strength (N/25 mm) was measured at a tension rate of 200 mm/min.

(2) Results

As the results of the evaluation test, both sample 1 and sample 2 had the adhesive strength of 15 N/25 mm. This satisfies the requirement of 5 N/25 mm.

B. Abrasion Resistance (1) Evaluation Method of Abrasion Resistance

A test piece of approximately 120 mm in diameter was cut from the vehicle interior material 1, and a hole of 6 mm in diameter was made at the center of the test piece. The test piece was set in a Taber abrasion tester (rotary abrasion tester manufactured by Toyo Seiki Seisakusho K.K.) and was subjected to an abrasion test by 100 rotations of an abrasion wheel (CS-10) under a load of 2.45 N. The abrasion state of the test piece after this abrasion test was evaluated in five levels by visual checking against specimen: A: no abrasion was observed; B: a little abrasion was observed but was indistinctive; C: abrasion was recognized but was relatively not obvious; D: abrasion was rather distinctive; and E: abrasion was significantly distinctive.

(2) Results

The results of the evaluation test were A for sample 1 and B for sample 2.

The present disclosure is not limited to the above embodiment, but may be implemented by various aspects within the scope of the present disclosure. Various modifications may be made without departing from the scope of the disclosure. Such modifications as well as their equivalents are also included in the scope of the disclosure. For example, the shapes, the structures, the dimensions and the materials of the base member and the surface member are not limited to those described in the above embodiment but may be modified or changed appropriately.

What is claimed is:

1. A vehicle interior material, comprising:
  a base member that includes a natural fiber or a glass fiber and a first thermoplastic resin as a binder and that has a density of 0.2 to 0.7 g/cm³; and
  a surface member that includes second thermoplastic resin fibers which comprise polyester resin fibers and low melting point resin fibers and that has a weight per unit area of 50 to 500 g/m², wherein:
    a low melting point resin of the low melting point resin fibers is a low melting point polyester resin having a melting point of 90 to 120° C.,
    the low melting point resin fibers couple the second thermoplastic resin fibers with one another,
    a weight ratio of the second thermoplastic resin fibers in the surface member is 50 to 95%, and a weight ratio of the low melting point resin fibers in the surface member is 5 to 20%,
    the surface member is laid on a surface of the base member,
    an entangled layer where the second thermoplastic resin fibers enter texture of the base member to be entangled with the natural fiber or the glass fiber and the first thermoplastic resin is provided at an interface between the base member and the surface member, and
    an adhesive strength between the base member and the surface member is 5 to 80 N/25 mm by peeling of 180 degrees with a peeling width of 25 mm.

2. The vehicle interior material according to claim 1, wherein the natural fiber is comprised of a plant fiber, and the first thermoplastic resin fiber is comprised of a polypropylene resin fiber.

3. The vehicle interior material according to claim 2, wherein the surface member further includes a polypropylene resin fiber.

4. The vehicle interior material according to claim 2, wherein the low melting point resin fiber is a low melting point polyethylene terephthalate resin fiber.

5. A manufacturing method of a vehicle interior material, the method comprising:
  a heating and expanding step of heating a base member that includes a natural fiber or a glass fiber and a first thermoplastic resin as a binder and that has a density of 0.2 to 0.7 g/cm³ to thermally expand thickness of the base member by 15 to 30% and make a state of fibers in the base member from a dense state to a sparse state; and
  a bonding step of laying a surface member that includes second thermoplastic resin fibers which comprise polyester resin fibers and which have a weight ratio of 50 to 95% in the surface member and low melting point resin fibers having a weight ratio of 5 to 20% in the surface member,
  wherein a low melting point resin of the low melting point resin fibers is a low melting point polyester resin having a melting point of 90 to 120° C., and that has a weight per unit area of 50 to 500 g/cm², on the heated and expanded base member, compressing the surface member laid on the base member to bond the surface member with the base member such that the second thermoplastic resin fiber enters texture of the base member to be entangled with the natural fiber or the glass fiber and the first thermoplastic resin, and melting and solidifying the low melting point resin fiber in the surface member to couple the second thermoplastic resin fibers with one another.

6. The manufacturing method of the vehicle interior material according to claim 5,
wherein the natural fiber is a plant fiber, and
the first thermoplastic resin is a polypropylene resin.

7. The manufacturing method of the vehicle interior material according to claim 6,
wherein the surface member further includes a polypropylene resin fiber, and
the bonding step comprises melting and solidifying the polypropylene resin fiber included in the base member.

8. The manufacturing method of the vehicle interior material according to claim 5,
wherein the low melting point resin fiber is a low melting point polyethylene terephthalate resin fiber.

9. The manufacturing method of the vehicle interior material according to claim 5,
wherein the bonding step comprises molding the vehicle interior material simultaneously with bonding the base member and the surface member.

* * * * *